Nov. 10, 1953
M. GELINAS
2,658,320
DISK TYPE LAWN MOWER
Filed May 15, 1952
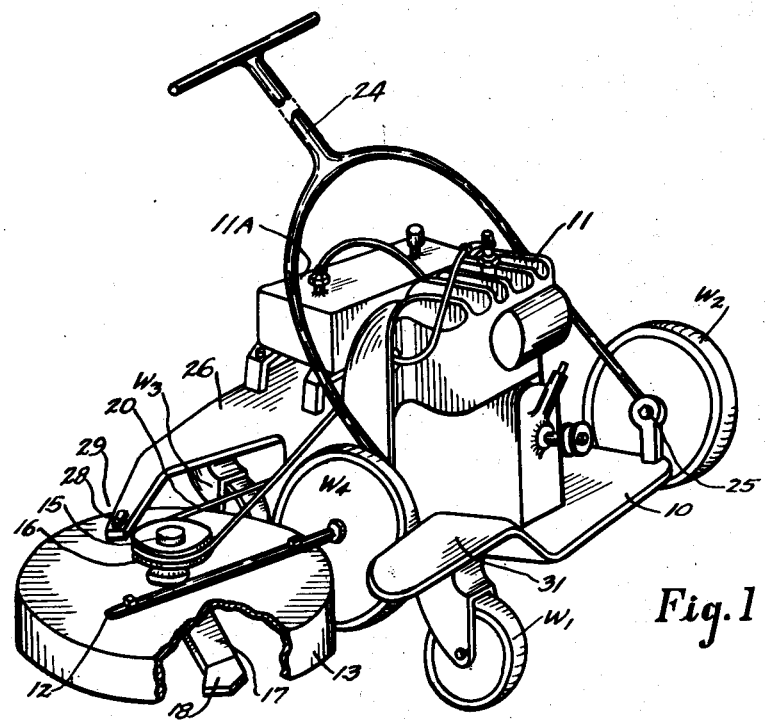
Fig.1
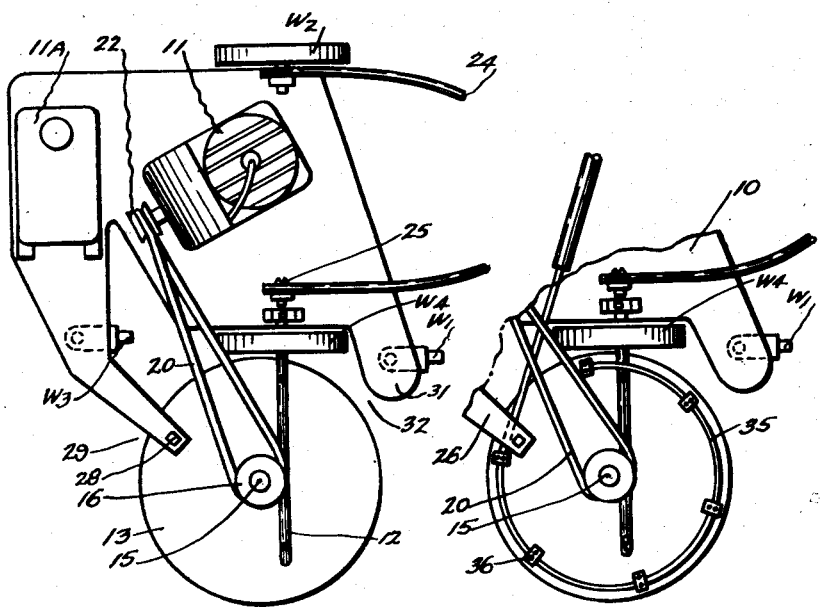
Fig.2
Fig.3
INVENTOR
MAURICE GELINAS
BY H.G. Hendry
ATTORNEY Patented Nov. 10, 1953

2,658,320

UNITED STATES PATENT OFFICE 2,658,320

DISK TYPE LAWN MOWER

Maurice Gelinas, L'Abord a Plouffe, Quebec, Canada

Application May 15, 1952, Serial No. 287,860

2 Claims. (Cl. 56—25.4)

My invention relates to a lawn mower.

More particularly, the invention relates to a self-powered lawn mower of the rotary cutter type.

The objects of the invention, generally, are to improve on known lawn mowers of the rotary cutter type.

A feature of the invention is that the rotary cutter is so disposed relatively to the supporting wheels of the mower that the grass may be cut right up to the edge of the lawn without damage to the lawn.

Another feature of the invention is that the wheels supporting the mower are so disposed that the possibility of the cutter damaging the lawn because of the unevenness of the ground is reduced to a minimum.

Still another feature of the invention is that the mower can easily and conveniently be moved through a gate or door even though one horizontal over-all dimension is in excess of the width of the gate or door, provided, of course, that the other horizontal over-all dimension is less than the width of the gate or door.

In the drawing, wherein is shown the preferred form of the invention, and wherein like numerals of reference indicate corresponding parts in the various figures, Figure 1 is a perspective view of the lawn mower;

Figure 2 is a plan view of Figure 1, parts such as the engine and gasoline tank being shown more or less diagrammatically; and, Figure 3 is a fragmentary view of Figure 2 showing a modification.

Referring now by numerals to the drawing, 10 is a wheel-supported frame providing a platform to which a conventional gasoline engine 11 is secured, the engine being fed from a tank 11A. One side of the frame 10 is supported above the ground by three wheels W3, W4 and W1. The opposite side of the frame is supported by a single wheel W2. The wheels W4 and W2 are supported for rotation on a same axis. The wheels W3 and W1 are suitably mounted to the frame for swivelling on vertical axes. The wheels W3 and W4 are in substantial alignment, that is the vertical axis on which the wheel W3 swivels lies in a vertical plane passing through the wheel W4. The wheel W1, on the other hand, is preferably slightly outwardly disposed of such plane. The arrangement of wheels and platform is such that the platform, and the engine, are as low as possible, so that the mower may be brought up as close as possible to the trunk of any shrub or small tree and clear the lowest branches of such shrub or tree.

The wheel W4 is positioned as closely to the adjacent edge of the frame as possible. The wheel W4 is suitably journalled on a shaft 12 rigidly secured at one end to the frame and extending outwardly beyond and through the wheel to form a support for a circular housing 13. The housing is so secured to the shaft as to lie as closely as possible to the wheel W4, and as close to the ground as possible, so that the mower may be brought as close to the trunk of a shrub or tree as possible and yet clear the lowermost branch of such shrub or tree.

Suitably journalled in the housing 13 is a vertical shaft 15 to the upper end of which is fixed a pulley 16. Fixed to the lower end of the shaft is the cutter element, which may comprise a bar 17 to the outer ends of which are secured cutters proper or knives 18. The effective cutting path of the knives is therefore in a horizontal plane.

The cutter is actuated from the engine by means of a belt 20 trained around the pulley 16 and a pulley 22 fixed to the driving shaft of the engine.

The mower is pushed or pulled over the ground as by a handle 24 the lower portion of which presents a fork the legs of which are pivotally connected to the frame as at 25. The axis on which the handle pivots is parallel with the axes on which the wheels W4 and W2 turn.

The frame is formed with a lateral extension terminating in an arm 26 secured to the housing as at 28. The arm is so directed and so attached to the housing that in effect, there is defined a recess, shown as 29. Such a recess is very desirable as it defines, in effect, a journal in which may be received a vertical object such as a gate post, for instance, so that the mower is easily rotated on the axis of the post by turning the mower bodily by the handle. The frame may also include a lateral extension 31 having an outer rounded end slightly spaced from the housing in effect defining a recess 32 serving the purpose of the recess 29 aforesaid. Such recesses are also very desirable in that when cutting the lawn around a tree, the mower is rotated bodily around the tree which serves as the axis around which the mower is rotated. As already stated, the cutter is intended to turn in a horizontal plane, and accordingly the four wheels are such that they will engage or rest on a same imaginary plane parallel with the plane of rotation of the cutter. However, the surface of a lawn is not always even, in that a shallow rise or ridge may intervene between otherwise level areas. For instance, if the wheels W3 and W1 were resting upon level areas between which intervened a rise, the cutter would scuff the lawn were it not for the intermediate wheel W4. Thus, the intermediate wheel, when riding over the ridge or rise, will bodily elevate therewith the cutter and substantially prevent scuffing of the lawn.

As will have been clearly gathered, the cutter is positioned effectively to cut the lawn in a swath offset from and to one side of the plane of the wheels W3 and W4, so that the lawn may be trimmed right up to its edge while the wheels ride on the lawn.

If desired, a safety expedient may be made part of the mower intended to discourage one from attempting to lift the mower off the ground as by grasping the housing 13 with one's hands. So grasping the housing may cause one's fingers to reach under the housing in the path of the knives 18. This safety measure is primarily for the protection of children.

Thus, as shown (more or less diagrammatically) in Figure 3, a bare wire or conductor 35 is disposed around part of the periphery of the housing, and supported at spaced intervals by suitable insulating posts 36. One end of the wire is operatively connected to the source of electricity feeding, say, the spark plug of the engine.

What I claim is:

1. A self-powered lawn mower comprising a frame, a pair of wheels rotatable on a common axis for supporting opposite sides of said frame, a circular housing horizontally supported laterally of one side of said frame closely adjacent to one of said wheels, an engine-operated cutter rotatable in said housing concentrically thereof the axis of said cutter being closely adjacent to the common axis of said wheels so that said cutter will bodily rise and lower with said one of said pair of wheels according to the surface of the ground on which said wheel travels, a handle pivotally connected to said frame in the common axis of said wheels, and a wheel swivelled to said frame on each side of said one of said wheels and in substantial tandem relationship thereto, all of said wheels being adapted to support said frame above the ground.

2. In the self-powered lawn mower of claim 1, said frame being formed on the side thereof which is adjacent to said housing to co-operate with said housing and provide recesses laterally of said handle and on opposite sides of the common axis of said pair of wheels selectively to receive a tree around the axis of which said frame may be bodily rotated by said handle.

MAURICE GELINAS.

References Cited in the file of this patent

UNITED STATES PATENTS

| Number | Name | Date |
|---|---|---|
| D. 145,438 | Goodall | Aug. 20, 1946 |
| 871,203 | Burhop | Nov. 19, 1907 |
| 1,710,749 | Svendsgaard | Apr. 30, 1929 |
| 1,787,677 | Guerin | Jan. 6, 1931 |
| 2,143,057 | Danielson | Jan. 10, 1939 |
| 2,538,230 | Boggs | Jan. 16, 1951 |
| 2,539,934 | Smith et al. | Jan. 30, 1951 |
| 2,615,292 | Winchell | Oct. 28, 1952 |